(12) United States Patent
Boehler (10) Patent No.: US 8,989,724 B2
(45) Date of Patent: Mar. 24, 2015

(54) METHOD OF MANAGING INCOMING COMMANDS RELATED TO CONTACTLESS APPLICATIONS WITHIN A WIRELESS APPARATUS SUCH AS AN NFC ENABLED MOBILE PHONE

(71) Applicant: STMicroelectronics Application GmbH, Aschheim-Dornach (DE)

(72) Inventor: Juergen Boehler, Munich (DE)

(73) Assignee: STMicroelectronics Application GmbH, Aschheim-Dornach (DE)

( * ) Notice: Subject to any disclaimer, the term of this patent is extended or adjusted under 35 U.S.C. 154(b) by 77 days.

(21) Appl. No.: 13/667,469

(22) Filed: Nov. 2, 2012

(65) Prior Publication Data

US 2013/0115935 A1    May 9, 2013

(30) Foreign Application Priority Data

Nov. 3, 2011 (EP) .................... 11306417

(51) Int. Cl.
*H04M 3/00* (2006.01)
*H04M 3/42* (2006.01)
*H04B 7/00* (2006.01)
*G06K 7/10* (2006.01)

(52) U.S. Cl.
CPC .................. *G06K 7/10237* (2013.01)
USPC ........ 455/418; 455/414.1; 455/41.2

(58) Field of Classification Search
USPC ............ 455/414.1, 414.2, 414.3, 418, 41.2, 455/41.3
See application file for complete search history.

(56) References Cited

U.S. PATENT DOCUMENTS

| | | | |
|---|---|---|---|
| 2006/0276206 A1* | 12/2006 | Shiotsu et al. | 455/462 |
| 2007/0265033 A1* | 11/2007 | Brostrom | 455/557 |
| 2008/0121687 A1 | 5/2008 | Buhot | |
| 2008/0185433 A1* | 8/2008 | Ando et al. | 235/439 |
| 2008/0207128 A1* | 8/2008 | Mikko | 455/41.2 |
| 2009/0137276 A1* | 5/2009 | Baldischweiler et al. | 455/558 |
| 2009/0247077 A1* | 10/2009 | Sklovsky et al. | 455/41.1 |
| 2009/0247078 A1* | 10/2009 | Sklovsky et al. | 455/41.1 |
| 2010/0041332 A1* | 2/2010 | Flygh et al. | 455/41.1 |
| 2010/0090805 A1* | 4/2010 | LIbotte | 340/10.2 |
| 2012/0077593 A1* | 3/2012 | Sarmenta | 463/40 |
| 2012/0171952 A1* | 7/2012 | Ohira et al. | 455/41.1 |
| 2013/0005245 A1* | 1/2013 | Royston | 455/41.1 |
| 2013/0203465 A1* | 8/2013 | Ali et al. | 455/558 |

FOREIGN PATENT DOCUMENTS

| | | |
|---|---|---|
| EP | 2075921 | 7/2009 |
| EP | 2447872 A1 | 5/2012 |
| WO | 2007144149 | 12/2007 |

OTHER PUBLICATIONS

Charles, Alexandre et al., EP20100306416, filed Dec. 15, 2010 (non-published document).

* cited by examiner

*Primary Examiner* — Christopher M Brandt
(74) *Attorney, Agent, or Firm* — Allen, Dyer, Doppelt, Milbrath & Gilchrist, P.A.

(57) ABSTRACT

An NFC controller analyzes incoming commands, by name, and decides, according a predefined name table, to which secure element the actual command and following commands are sent for processing.

29 Claims, 6 Drawing Sheets

METHOD OF MANAGING INCOMING COMMANDS RELATED TO CONTACTLESS APPLICATIONS WITHIN A WIRELESS APPARATUS SUCH AS AN NFC ENABLED MOBILE PHONE

FIELD OF THE INVENTION

The invention relates to the communication between components or elements, in particular between a contactless element, for example an NFC ("Near Field Communication") controller element and at least two auxiliary elements, such as a UICC or secure elements, for example located within a wireless apparatus, for example a mobile phone.

The invention relates more particularly to the routine of radio frequency (RF) communication compliant with the ISO/IEC 14443-4 standard to RF applications installed on different secure elements within an NFC enabled device. One of these secure elements may be a UICC with a SWP/HCI interface compliant with the ETSI TS 102 613 and ETSI TS 102 622 specifications.

BACKGROUND OF THE INVENTION

As defined within ETSI TR 102 216 V3.0.0 (September 2003), UICC which is neither an abbreviation nor an acronym, designates a smart card that conforms to the specifications written and maintained by the ETSI Smart Card Platform project.

Further to its conventional telephone function, a mobile phone may be used for exchanging information with a contactless device by using a contactless communication protocol. This permits the exchange of information between the contactless device and elements located within the mobile phone. Plenty of applications are thus possible, such as, mobile ticketing in public transport (the mobile phone acts as a ticket) or mobile payment (the mobile phone acts as a debit/credit payment card).

Near Field Communication or NFC is a short range high frequency wireless communication technology which enables such exchange of data between two contactless devices over a short distance, for example, 10 centimeters. NFC is an open platform technology standardized in ISO/IEC 18092 and ISO/IEC 21481, but incorporates a variety of pre-existing standards including ISO/IEC 14443 protocol type A and type B.

Mobile phone manufacturers are interested in connecting two different auxiliary elements to NFC chips. As a matter of fact, having two separate auxiliary elements allows the clear separation of applications coming from different issuers (banks, transport operators, network operators . . . ).

At present, the mobile phone user may activate either the UICC or the other embedded secure element before performing a RF transaction. Thus, the RF terminal or RF reader is only able to see the RF applications from one auxiliary element, but not from both auxiliary elements at the same time, i.e. in the same RF session. So, the RF terminal has only limited capabilities to select the right RF application, as the user has to make a pre-selection before.

SUMMARY OF THE INVENTION

According to an embodiment, it may be possible to select, for example, one of the RF applications installed within a first auxiliary element, for example, a UICC, and one of the RF applications installed within another auxiliary element, for example, an embedded secure element, inside an NFC enabled phone, during a same single RF session. Therefore the RF terminal communicating with such NFC enabled phones is able to have access to all RF applications installed on both auxiliary elements during a same RF session.

According to another embodiment, RF applications may be provided from a UICC and another auxiliary element to an RF terminal, without any proprietary modifications of the UICC.

According to a particular aspect, a method may be directed to managing incoming commands related to contactless applications, within a device comprising a contactless element, for example, an NFC controller, and at least two auxiliary elements connected thereto, including at least one secure element and one UICC. The method may include, for example, analyzing a current incoming command within the contactless element, and if the current incoming command is a selection command including identification information of a desired contactless application, verifying whether or not the identification information is included in a table including identification information related to contactless applications hosted within at least one of the auxiliary elements, including at least the at least one secure element.

If the identification information is included in the table, the method may include selecting the auxiliary element hosting the desired contactless application and sending the current selection command to the selected auxiliary element. If the identification information is not included in the table, the method may include selecting the UICC and sending the current selection command to the UICC.

At this stage, two cases are possible. Either the UICC actually hosts the desired contactless application (although the corresponding identification information is not in the table), or the desired contactless application is actually not hosted in the UICC.

In the later case (the UICC does not host the desired contactless application), the step of selecting the UICC and sending the current selection command to the UICC advantageously further comprises sending to the contactless element a response containing an error message.

In the case the selected auxiliary element (either UICC or another secure element) actually hosts the desired contactless application, the method further comprises sending all other incoming commands following the current selection command directed to the selected auxiliary element actually hosting the desired contactless application until reception of a new selection command.

Thus, with such mechanism, the RF terminal or RF reader may have access to any RF application stored in the device whatever the location of this contactless application (either the secure element or the UICC). It is thus possible to select an RF application installed within a UICC and afterwards select an RF application installed within the secure element during one single RF communication session, i.e. without interrupting the RF field generation. For example, a first banking application may be selected and directly afterwards another application (a second banking application or a transport application) may be selected, even if both applications are hosted by two different auxiliary elements. Further, any conventional UICC capable of supporting RF applications, for example any SWP-UICC can be used without proprietary modifications.

According to an embodiment, one of the auxiliary elements may include a default contactless application, and, if the first incoming command received by the contactless element is not a selection command, the method further comprises selecting the auxiliary element hosting the default contactless application and sending all other incoming commands following the first command directly to the selected auxiliary element until reception of a selection command.

According to another aspect, a device aspect includes a contactless element and at least two auxiliary elements connected to the contactless element and including at least one secure element and one UICC. The device also includes memory means or a memory device for storing a table including identification information related to contactless applications hosted within at least one of the auxiliary elements including at least the at least one secure element. The contactless element includes main interface means or an interface configured to receive incoming commands related to contactless applications and to deliver responses, main processing means or a main processor including analyzing means or an analyzer device configured to analyze a current incoming command and if the current incoming command is a selection command containing an identification information of a desired contactless application, verify whether or not the identification information is included in the table. The main processing means or main processor may also include selection means or a selector configured to controllably select one auxiliary element, transmission means or a transmission device configured to send a command to a selected auxiliary means, and control means or a controller.

The control means or controller is configured to, upon reception of a selection command related to a desired contactless application and including identification information contained in the table, control the selection means for selecting the auxiliary element hosting the desired contactless application. Upon reception of a selection command related to a desired contactless application and including identification information not contained in table, the control means or controller is configured to control the selection means for selecting the UICC, and control the transmission means for sending the selection command to said selected auxiliary element. The control means or controller is also configured to send all other incoming commands following the selection command directly to the selected auxiliary element actually hosting the desired contactless application until reception of a new selection command. Each auxiliary element comprises an auxiliary interface means or an auxiliary interface configured to receive an incoming command and to send a response, and auxiliary processing means or an auxiliary processor configured to process the incoming command and to elaborate the response.

According to an embodiment, the auxiliary processing means of the UICC are further configured to; if the desired contactless application is actually not hosted in the UICC, elaborate a response containing an error message. According to an embodiment, one of the auxiliary elements includes a default contactless application and the control means are further configured to, if the first incoming command received by the contactless element is not a selection command, to control the selection means for selecting the auxiliary element hosting the default contactless application and the transmission means for sending all other incoming commands following said first command directly to the selected auxiliary element until reception of a selection command.

According to another aspect, an apparatus is comprises an antenna and a device as defined above, coupled to the antenna. The apparatus may be a wireless communication apparatus, for example, a mobile phone.

According to another aspect, a computer program product directly loadable in a memory of a computer system, for example, one or more processors and its associated memories, is proposed. The computer program product comprises program instructions adapted to cause execution of the method as defined above when the computer program is run by the computer system.

According to another aspect, a support, for example, memory means or memory, readable by a computer system, is proposed, having program instructions thereon adapted to cause execution by the computer system of the method as defined above.

DETAILED DESCRIPTION OF THE PREFERRED EMBODIMENTS

Embodiments of the invention will be now described in the technical field of contactless elements or components connected to secure elements, in particular embedded in a mobile phone, although the invention is not limited to these particulars embodiments.

A contactless element is an element or a component able to exchange information through an antenna with a contactless device according to contactless communication protocol. An NFC element or component, which is a contactless element, is an element or component compliant with the NFC technology.

Figure 1:
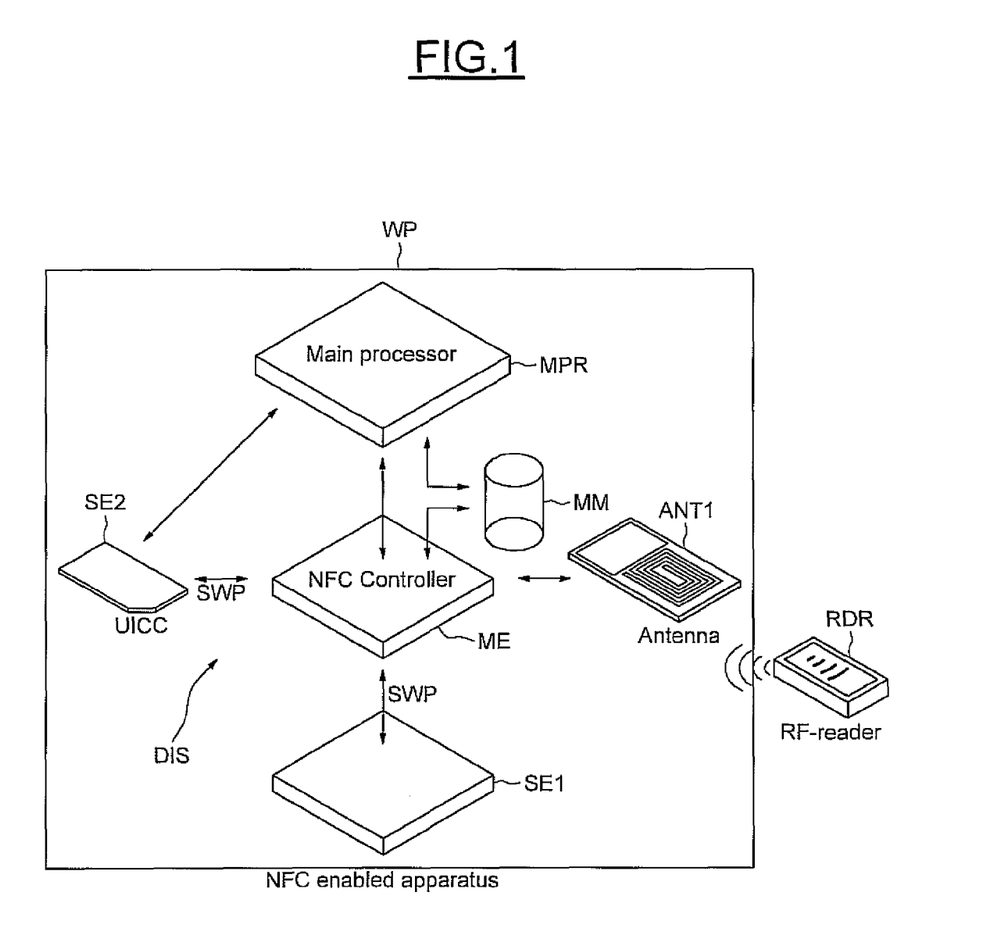
FIG. 1 is a schematic diagram of an NFC enable apparatus according to an embodiment of the invention.

FIG. 1 illustrates an NFC enabled apparatus WP, e.g. a NFC mobile phone. The apparatus WE comprises a device DIS including a contactless front end element ME, for example, an NFC controller, which is responsible for wireless communication, for example, radio frequency (RF communication), with an external RF reader RDR through an antenna ANTI. The contactless communication protocol is, for example, the one disclosed in ISO/IEC 14443-4.

The device also comprises two auxiliary secure elements SE1 and SE2 connected to the NFC controller ME. A secure element is, for example, an element configured to include secure or protected information, for example, banking information, information related to a telephone subscription, etc. The secure element SE1 is here an embedded secure element, for example, totally embedded in an integrated circuit including the NFC controller, and for example, packed with the NFC controller. In other words, here, the secure element SE1 is permanently incorporated in the mobile phone, i.e. without being able to be removed. The secure element SE1 hosts, for example, some particular ISO/IEC 14443-4 compliant RF applications running in card emulation mode, for example banking or transport applications. The second auxiliary element SE2 is here a removable secure element, for example, a UICC providing the network subscription (SIM and USIM application) and some RF applications using the ISO/IEC 14443-4 protocol layer in card emulation mode.

The mobile phone WP also comprises a main processor MPR responsible for managing the UICC and NFC controller, and also for user input and network communication. Each contactless application is associated with a unique identification information, for example, the DF (Dedicated File) name parameter as defined in ISO/IEC 7816-4.

Thus, the device DIS also comprises a memory MM, connected to the NFC controller ME, and preferably incorporated in the NFC controller, and storing a table including the identification information of the contactless applications hosted in the secure element SE1, and eventually in the UICC SE2, and which is enabled for a specific power mode. The DF names of the RF applications hosted eventually by the UICC may be unknown. This table may be updated by the main processor when, for example, the user deactivates a particular RF application hosted in the embedded secure element SE1.

One of the secure elements, for example, the secure element SE1, hosts a default contactless application and the main processor provides the NFC controller with information related to this default RF application, and its corresponding power mode. Each auxiliary or secure element SE1, SE2 is connected to the NFC controller ME through a SWP link. A SWP link is a link or line adapted to support the single wire protocol (SWP).

The Single Wire Protocol (SWP) is a bit oriented, point-to-point communication protocol between a secure element and a contactless front end, and is specified in the standard ETSI TS 102 613, for example, version V7.7.0 (October 2009) thereof. The man skilled in the art could refer, if necessary, to this document.

Figure 2:
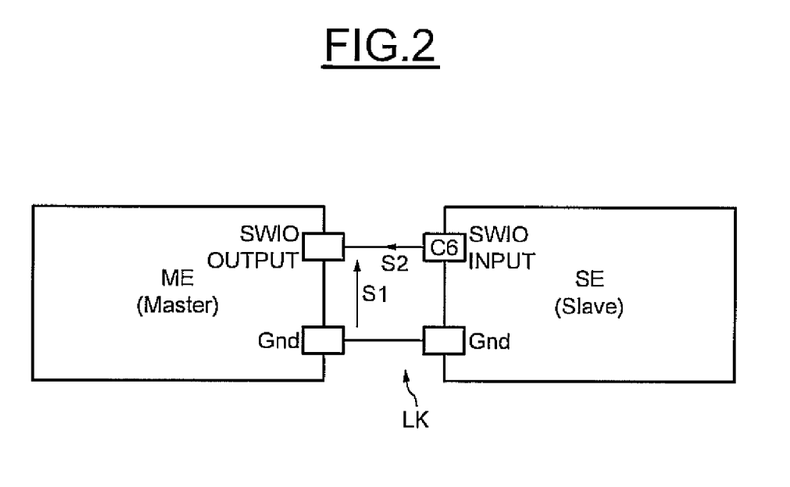
FIGS. 2 and 3 are schematic diagrams of connections between a main element and auxiliary elements through a SWP link according to an embodiment of the invention.

More precisely, as illustrated in FIG. 2, the NFC controller ME is the master, whereas a secure (auxiliary) element SE is a slave. The master and a slave are mutually connected through a SWP link LK.

As disclosed in ETSI TS 102 613, the principle of the single wire protocol (SWP) is based on the transmission of digital information in full duplex mode. The signal S1 from ME to SE is transmitted by a digital modulation (L or H) in the voltage domain, whereas the signal S2 from SE to ME is transmitted by a digital modulation (L or H) in the current domain.

When the master sends S1 as state H, then the slave may either draw a current (state H) or not (state L) and thus transmits S2. With pulse width modulation bit coding of S1, it is possible to transmit a transmission clock, as well as data in full duplex mode. More details can be found in ETSI TS 102 613.

As for the secure element SE1, the UICC is also connected to the NFC controller by a SWP link using HCI (Host Controller Interface) as disclosed within ETSI TS 102 613 and ETSI TS 102 622.

Figure 3:
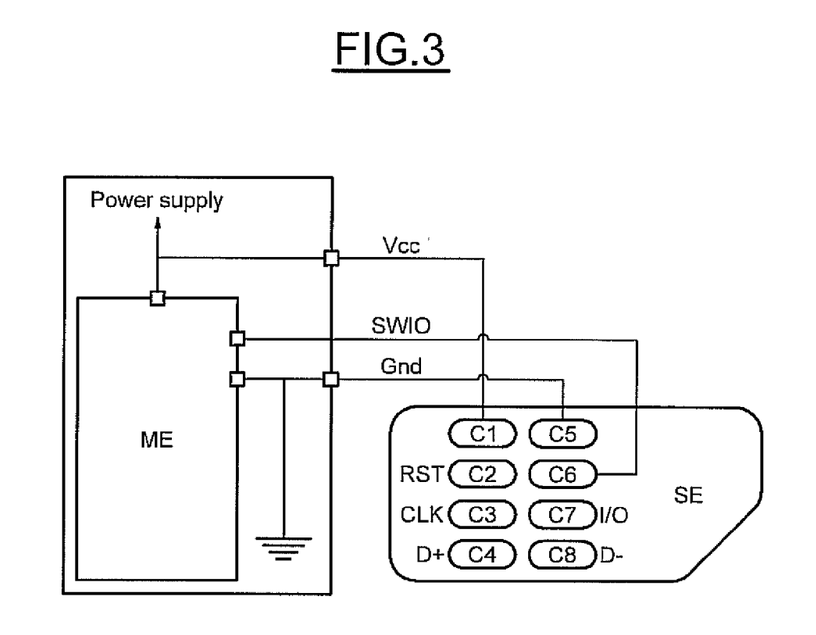

FIG. 3 illustrates an embodiment of the physical link between the contactless element ME and a UICC. More precisely, as illustrated in this figure and explained in ETSI TS 102 613, the contact C6 of the UICC is connected to the port SWIO of the contactless element ME for transmission of signal S1 and S2.

Figure 4:
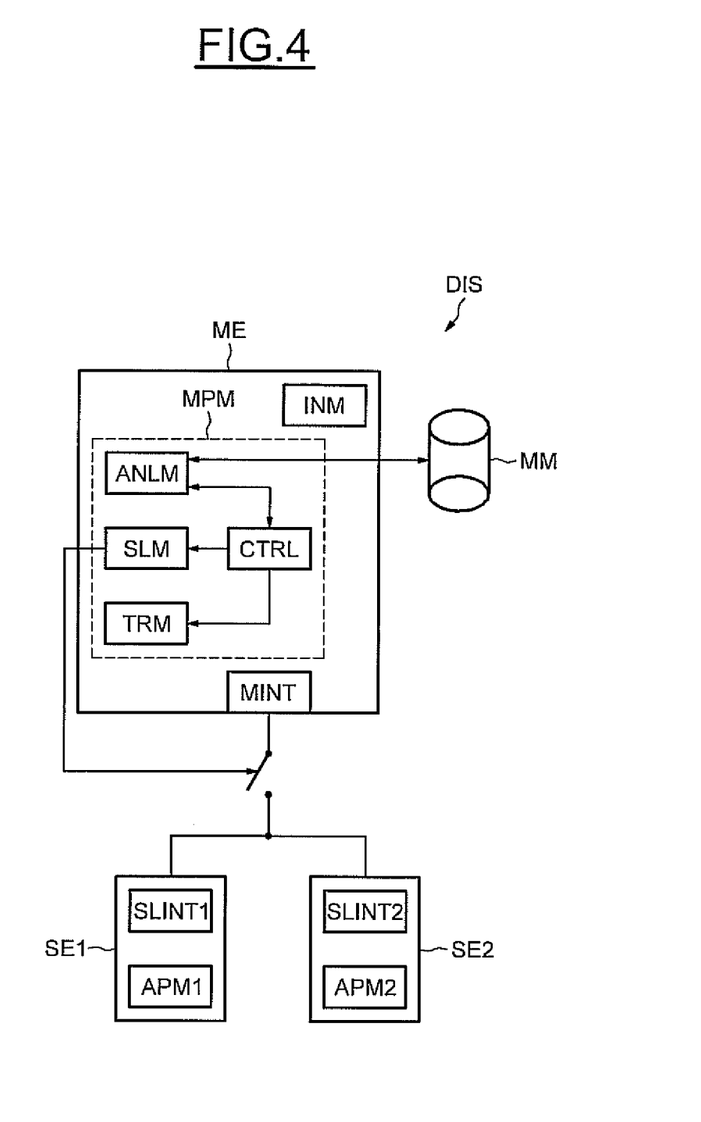
FIG. 4 is a more detailed schematic diagram of an embodiment of a device according to the invention.

Referring now more particularly to FIG. 4, the NFC controller ME comprises main interface means or a main interface INM configured to exchange information with a RF reader, and more particularly to receive incoming commands related to contactless (RF) applications and to deliver responses.

The NFC controller ME further comprises main processing means or a main processor MPM including analyzing means or an analyzer or analysis circuitry (ANLM) configured to analyze a current incoming command, selection means or a selector or selection circuitry (SLM) configured to controllably select one of the secure elements SE1 or SE2, transmission means or a transmission device or circuitry TRM configured to send a command to selected auxiliary means or auxiliary device through main SWP interface means or a main interface MINT.

The analyzing means, the selection means, and the transmission means are controlled by a control means or controller CTRL. All these means may be realized by software modules within a processor.

Each auxiliary element SE1, SE2 comprises SWP auxiliary interface means or an auxiliary interface SLINT1, SLINT2 configured to receive an incoming command and to send a response, as well as auxiliary processing means or an auxiliary processor APM1, APM2 configured to process the incoming command and to elaborate the corresponding response. These auxiliary processing means may be also realized, for example, by a software module within a processor.

Figure 5:
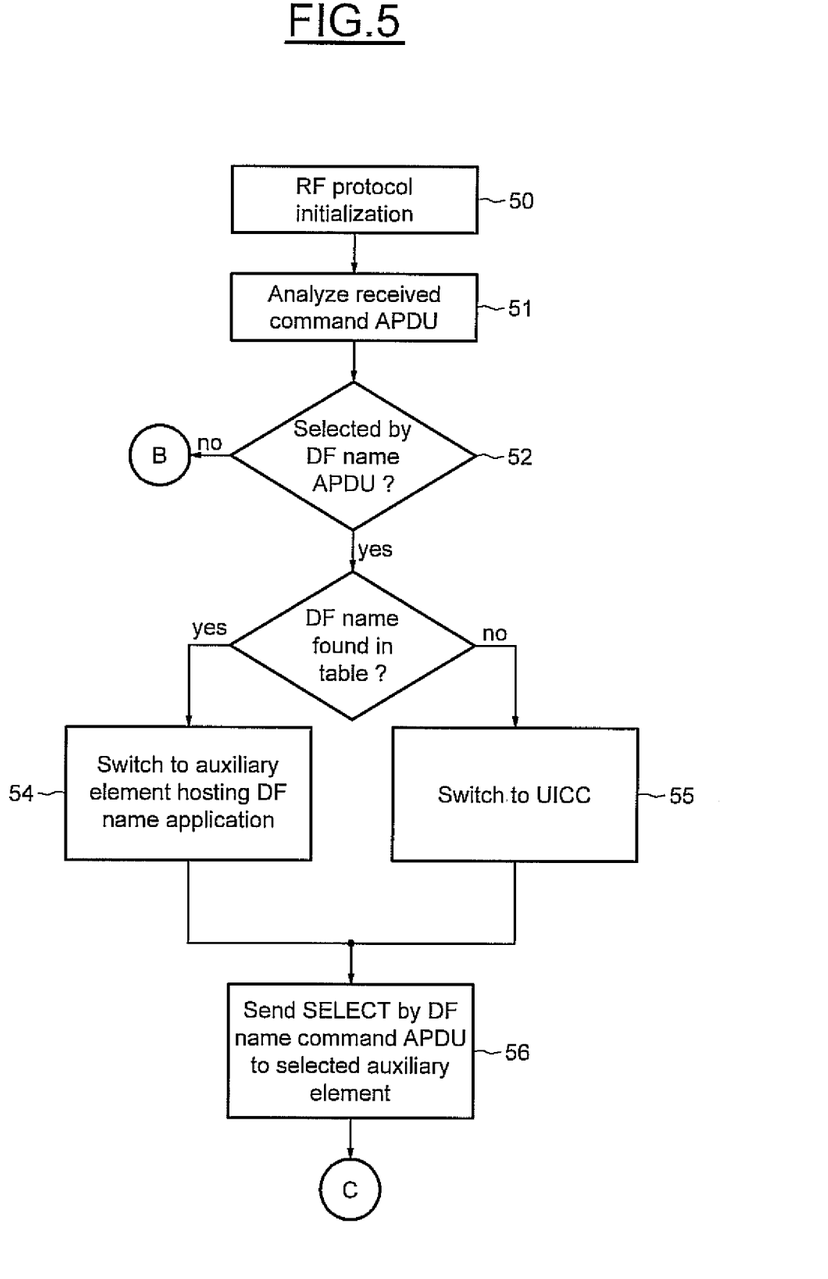
FIGS. 5-8 are flow charts related to particular embodiments of a method according to the invention.

Referring now more particularly to FIG. 5 and following, particular embodiments of a method according to the embodiments for managing incoming commands related to RF applications within the device DIS are described. After a successful RF protocol initialization (step 50) (FIG. 5) according to ISO/IEC 14443-4, the analyzing means ANLM of the NFC controller analyze (step 51) any incoming command APDU. APDU is a conventional abbreviated term for "Application Protocol Data Unit".

To activate a desired RF application, the RF reader RDR sends, to the NFC controller, a selection command including identification information of the desired contactless application. This selection command may be, for example, a so called "SELECT by DF name command" APDU defined in ISO/IEC 7816-4. This particular selection command includes the DF name parameter identifying a desired RF application.

As illustrated in FIG. 5, if the received incoming command APDU is a selection command (step 52), the analyzing means ANLM of the NFC controller verifies (search) (step 53) whether or not the identification information DF included in the selected by DF name command APDU is included in the table stored in memory means MM or memory. This search is performed, for example, according to the rules defined within chapter 7.1.1 of ISO/IEC 7816-4.

If the DF name of the desired contactless application is found in the table, the selection means SLM are controlled by the control means CTRL for selecting the auxiliary element hosting this contactless application designated by the DF name. And, there is a switch to this selected auxiliary element (step 54). This auxiliary element may be either the secure element SE1 or the UICC SE2.

Figure 6:
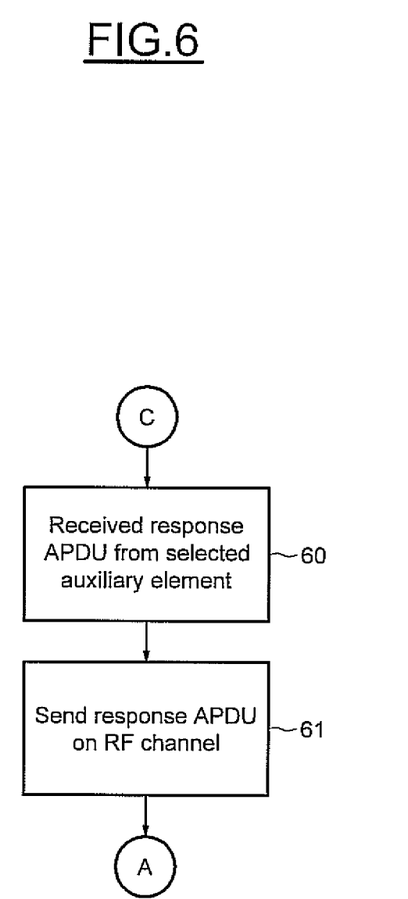
Figure 7:
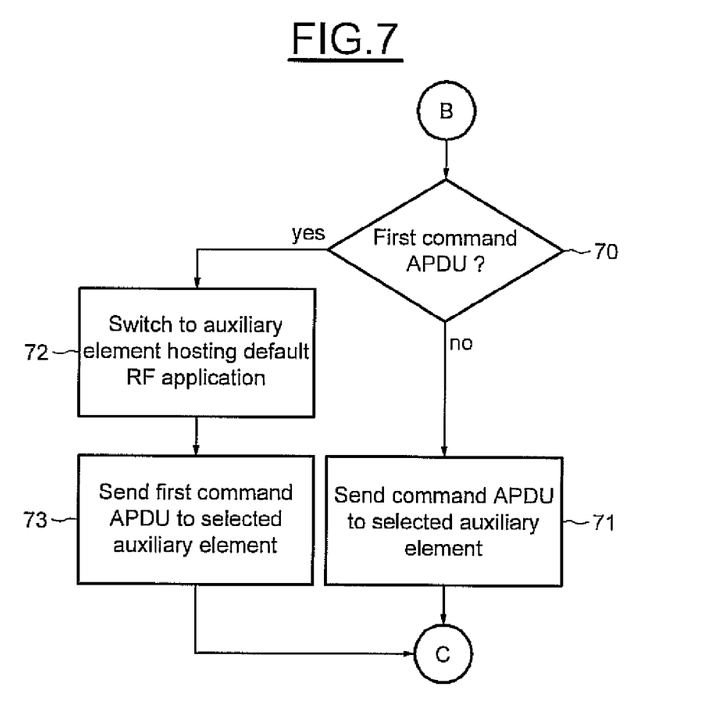

The selected by DF name command APDU is sent by the transmission means to the selected auxiliary element (step 56) through the main SWP interface MINT. As illustrated in FIG. 6, the NFC controller receives a response APDU from the selected auxiliary element (step 60), and the NFC controller sends this response APDU to the RF reader through the RF channel (step 61). As illustrated in FIG. 7, the control means controls the transmission means for sending all other incoming commands following the selection command directly to the selected auxiliary element (step 71), until reception of a new selection command.

Referring now again to FIG. 5, if the OF name of the desired RF application requested by the RF reader is not found in the table, then, the selection means selects the UICC and there is a switch 55 to UICC. As already explained, the selection command is sent (step 56) to the selected auxiliary element, i.e. the UICC.

Figure 8:
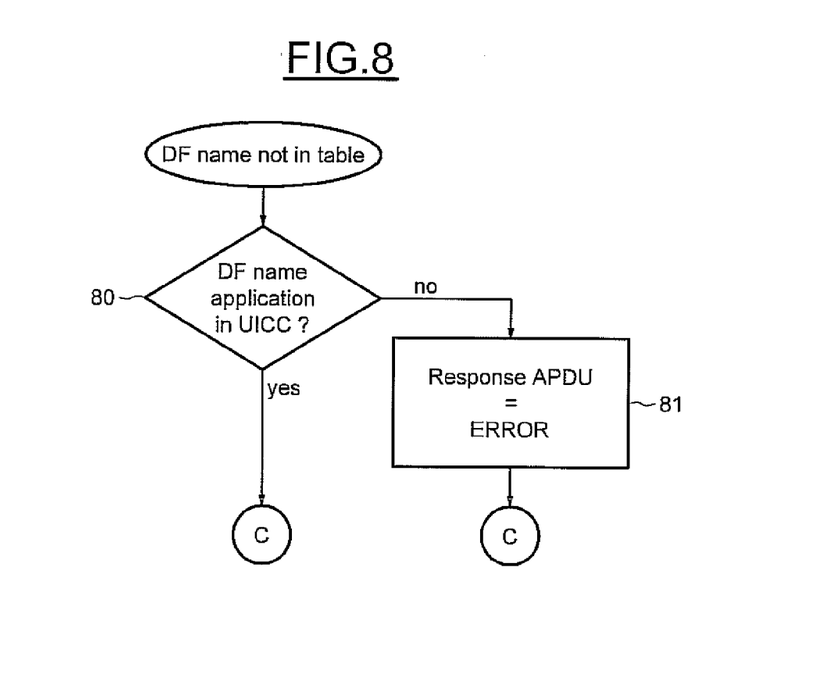

Two cases are now possible as illustrated in FIG. 8. As a matter of fact, the application designated by the DF name not found in the table may be actually hosted in the UICC or not. As a matter of fact, as explained above, depending, for example, on the operator providing the UICC, the UICC may be not allowed to disclose the RF applications installed therein.

If the application designated by the DF name is actually hosted in UICC, then, after step 56 the mechanism continues with steps 60, 61 of FIG. 6 and step 71 of FIG. 7 until reception of a new selection command. If the application designated by the DF name not found in the table is actually not installed within the UICC, then after step 56, the auxiliary processing means or auxiliary processor of the UICC elaborates a response APDU including an error message (step 81).

The mechanism continues with the reception in step 60 of this error message, and the emission of this error message to the RF reader and the RF channel. This error message indicates to the RF reader that this desired contactless application is not hosted within the mobile phone. But, anyway, the UICC can still operate with the NFC controller for other applications, for example, telephone communication.

Optionally a signal called "EVT_CARD_ACTIVATED" may be sent to the UICC host when no APDU was sent before to the UICC within the current RF session to avoid any potential interoperability issues. Afterwards the actual selection command may be sent within another signal called "EVT_SEND_DATA" to UICC without any modification for further APDU processing by the UICC.

Referring now again to FIG. 5, (step 52) and to FIG. 7, if the incoming command is not a selection command, and if this incoming command is the first command APDU, then, the control means or controller controls the selection means or selector to switch (step 72) to the auxiliary element hosting the default RF application. This first command APDU is then sent to the selected auxiliary element (step 73), and the mechanism continues with step 60 and 61 of FIG. 6 and with step 71 of FIG. 7 until reception of a new selection command.

Compared to an implementation for a single secure element, the EVT_CARD_ACTIVATED may be sent to the UICC delayed. Depending of the RF Terminal speed and the first APDU length, this delay may be in the range of a few milliseconds.

Every SELECT command with the Select by DF name parameter will be further delayed by the additional DF name check. These delays may lead to a violation of the timing requirements for SHDLC transfer according ETSI TS 102 613. But this violation cannot be detected by the UICC as the UICC cannot identify if this delay is caused by the RF terminal or by the NFC controller. Also the RF terminal has to accept a longer processing time by the NFC enabled phone as long as no time-out error is generated by the NFC enabled phone.

So the method according to an aspect would allow a correct operation with SWP-UICCs without any specific modifications. Many approaches are possible for switching the NFC controller to one of the secure elements. For example, the two auxiliary elements may be connected by two separate SWP physical connections to the NFC controller provided in this case with two separate SWP interfaces (forming the main interface means MINT), respectively dedicated and connected to the two slave interfaces SLINT1, SLINT2 of the auxiliary elements by two SWP links. The switching is thus performed conventionally within the NFC controller by choosing the appropriate SWP interface.

Another approach, disclosed, for example, in European Patent Application P No. 10306177, may include connecting the two auxiliary elements by one SWP link and activating at once only one slave SWP interface SLINT1 or SLINT2 on the SWP link. More precisely, this activating comprises allowing each slave SWP interface to listen to the SWP link, sending from the main SWP interface MINT of the NFC controller, a selection frame on the SWP link, including an identification of the slave SWP interface to be activated, and allowing only the slave SWP interface to be activated to respond to the selection frame, each other slave SWP interface remaining silent.

Another possible approach, disclosed, for example, in European Patent Application Publication No. 10306416, comprises connecting both slave SWP interfaces SLINTi to the master SWP interface MINT of the NFC controller through a controllably switchable SWP link and controlling the SWP link switching for selectively activating at once only one slave SWP interface on said SWP link. More precisely, connecting the slave SWP interfaces to the master SWP interface through a controllably switchable SWP link comprises connecting a controllable multiplexer/demultiplexer switch between the master SWP interface and the SWP interfaces, and controlling the SWP link switching includes controlling the multiplexer/demultiplexer switch for switching the SWP link to the selected slave SWP interface.

Although the preceding embodiments have been disclosed in the case where an auxiliary element is a UICC, other embodiments are possible in which both auxiliary elements are, for example, secure elements, in particular embedded secure elements, without being necessarily a UICC. In such a case, generally speaking, the method of managing incoming commands related to contactless applications within a device comprising a contactless element and at least two auxiliary elements connected thereto, comprises analyzing a current incoming command within the contactless element, and if the current incoming command is a selection command including an identification information of a desired contactless application verifying whether or not the identification information is included in a table including identification information related to contactless applications hosted within at least one of said auxiliary elements. If the identification information is included in the table, the method includes selecting the auxiliary element hosting the desired contactless application, sending the current selection command to the selected auxiliary element. The method also includes sending all other incoming commands following the current selection command directly to the selected auxiliary element until reception of a new selection command.

In such an embodiment, all the DF names of the RF applications hosted by the two auxiliary elements are assumed to be included in the table. Thus, if the DF name included in the incoming selection command is not found in the table, an error message is sent back to the NFC controller. The main processor may optionally also host some ISO/IEC 14443-4 compliant RF applications in a card emulation mode. In such a case, the method described above applies also to the main processor, which is thus considered as another auxiliary element.

That which is claimed is:

1. A method of managing incoming commands related to contactless applications within a device comprising a contactless element and a plurality of auxiliary elements connected thereto, the method comprising:

analyzing a current incoming command within the contactless element;

if the current incoming command is a selection command including identification information of a desired contactless application, verifying whether the identification information is included in a table including identification information related to contactless applications hosted within at least one of the plurality of auxiliary elements;

if the identification information is included in the table, selecting one of the plurality of auxiliary elements hosting a desired contactless application and sending the selection command to the selected auxiliary element; and sending other incoming commands following the selection command to the selected auxiliary element until reception of a new selection command.

2. The method according to claim 1, wherein sending other incoming commands comprises sending all other incoming commands.

3. The method according to claim 1, wherein the plurality of auxiliary elements comprises at least one secure element and at least one universal integrated circuit card (UICC); and wherein the method further comprises if the identification information is not included in the table, selecting the UICC and sending the selection command to the UICC.

4. The method according to claim 3, wherein selecting the UICC and sending the selection command to the UICC further comprises, if the desired contactless application is not hosted in the UICC, sending the response to include an error message to the contactless element.

5. The method according to claim 1, wherein one of the plurality of auxiliary elements includes a default contactless application, and if a first incoming command received by the contactless element is not a selection command, the method further comprising selecting one of the plurality of the auxiliary elements hosting the default contactless application and sending all other incoming commands following the first incoming command to the selected auxiliary element until reception of the new selection command.

6. A device comprising:
a contactless element;
a plurality of auxiliary elements coupled to said contactless element; and
a memory configured to store a table including identification information related to contactless applications hosted within at least one of said plurality of auxiliary elements;
said contactless element comprising
a main interface configured to receive incoming commands related to contactless applications and to deliver responses,
a main processor comprising
analysis circuitry configured to analyze a current incoming command, and, if the current incoming command is a selection command including identification information of a desired contactless application, verify whether the identification information is included in the table,
selection circuitry configured to controllably select one of said plurality of auxiliary elements,
transmission circuitry configured to send a command to a selected one of said plurality of auxiliary elements, and
a controller configured, upon reception of a selection command related to a desired contactless application and including identification information included in the table, to
control said selection circuitry for selecting said selected auxiliary element hosting the desired contactless application, and
control the transmission circuitry for sending the selection command to said selected auxiliary element, and
send other incoming commands following the selection command to said selected auxiliary element until reception of a new selection command;

each of said plurality of auxiliary elements comprising an auxiliary interface configured to receive an incoming command and to send a response, and an auxiliary processor configured to process the incoming command and generate the response.

7. The device according to claim 6, wherein said controller is configured to send all other incoming commands following the selection command to said selected auxiliary element until reception of the new selection command.

8. The device according to claim 6, wherein said plurality of auxiliary elements comprises at least one secure element and at least one universal integrated circuit card (UICC);
wherein the table includes identification information related to contactless applications hosted within said at least one secure element; and
wherein said controller is further configured to, upon reception of a selection command related to a desired contactless application and including an identification information not included in the table, control said selection circuitry for selecting the UICC.

9. The device according to claim 8, wherein said auxiliary processor of said UICC is further configured to, if the desired contactless application is not hosted in said UICC, generate the response to include an error message.

10. The device according to claim 6, wherein at least one of said plurality of auxiliary elements includes a default contactless application; and wherein said controller is further configured to, if the first incoming command received by the contactless element is not a selection command, control said selection circuitry for selecting the auxiliary element hosting the default contactless application and said transmission circuitry for sending all other incoming commands following the first command to the selected auxiliary element until reception of the new selection command.

11. The device according to claim 6, wherein said contactless element comprises a near field communication (NFC) controller.

12. The device according to claim 6, wherein at least one of said auxiliary elements comprises an embedded secure element.

13. A device for managing incoming commands related to contactless applications comprising:
a plurality of auxiliary elements; and
a processor coupled to said plurality of auxiliary elements and configured to
analyze a current incoming command,
if the current incoming command is a selection command including identification information of a desired contactless application, verify whether the identification information is included in a table including identification information related to contactless applications hosted within said at least one of the plurality of auxiliary elements,
if the identification information is included in the table, select one of said plurality of auxiliary elements hosting a desired contactless application and send the selection command to said selected auxiliary element, and
send other incoming commands following the selection command to said selected auxiliary element until reception of a new selection command.

14. The device according to claim 13, wherein said processor is configured to send all other incoming commands following the selection command to said selected auxiliary element until reception of the new selection command.

15. The device according to claim 13, wherein said plurality of auxiliary elements comprises at least one secure element and at least one universal integrated circuit card (UICC); and wherein said processor is configured to, if the identification information is not included in the table, select said UICC and send the selection command to said UICC.

16. The device according to claim 15, wherein said processor is configured to, if the desired contactless application is not hosted in said UICC, send the response to include an error message.

17. An apparatus comprising:
an antenna; and
a device coupled to said antenna and comprising
a contactless element,
a plurality of auxiliary elements coupled to said contactless element, and
a memory configured to store a table including identification information related to contactless applications hosted within at least one of said plurality of auxiliary elements;
said contactless element comprising
a main interface configured to receive incoming commands related to contactless applications and to deliver responses,
a main processor comprising
analysis circuitry configured to analyze a current incoming command, and, if the current incoming command is a selection command including identification information of a desired contactless application, verify whether the identification information is included in the table,
selection circuitry configured to controllably select one of said plurality of auxiliary elements,
transmission circuitry configured to send a command to a selected one of said plurality of auxiliary elements, and
a controller configured, upon reception of a selection command related to a desired contactless application and including identification information included in the table, to
control said selection circuitry for selecting said selected auxiliary element hosting the desired contactless application, and
control the transmission circuitry for sending the selection command to said selected auxiliary element, and
send other incoming commands following the selection command to said selected auxiliary element until reception of a new selection command,
each of said plurality of auxiliary elements comprising
an auxiliary interface configured to receive an incoming command and to send a response, and an auxiliary processor configured to process the incoming command and generate the response.

18. The apparatus according to claim 17, wherein said controller is configured to send all other incoming commands following the selection command to said selected auxiliary element until reception of the new selection command.

19. The apparatus according to claim 17, wherein said plurality of auxiliary elements comprises at least one secure element and at least one universal integrated circuit card (UICC);
wherein the table includes identification information related to contactless applications hosted within said at least one secure element; and
wherein said controller is further configured to, upon reception of a selection command related to a desired contactless application and including an identification information not included in the table, control said selection circuitry for selecting the UICC.

20. The apparatus according to claim 19, wherein said auxiliary processor of said UICC is further configured to, if the desired contactless application is not hosted in said UICC, generate the response to include an error message.

21. The apparatus according to claim 17, wherein at least one of said plurality of auxiliary elements includes a default contactless application; and wherein said controller is further configured to, if the first incoming command received by the contactless element is not a selection command, control said selection circuitry for selecting the auxiliary element hosting the default contactless application and said transmission circuitry for sending all other incoming commands following the first command to the selected auxiliary element until reception of the new selection command.

22. The apparatus according to claim 17, wherein said contactless element comprises a near field communication (NFC) controller.

23. The apparatus according to claim 17, wherein at least one of said auxiliary elements comprises an embedded secure element.

24. The apparatus according to claim 17, wherein said apparatus comprises a wireless communication apparatus.

25. A non-transitory computer-readable medium comprising computer executable instructions for managing incoming commands related to contactless applications within a device comprising a contactless element and a plurality of auxiliary elements connected thereto, the computer executable instructions for
analyzing a current incoming command within the contactless element;
if the current incoming command is a selection command including identification information of a desired contactless application, verifying whether the identification information is included in a table including identification information related to contactless applications hosted within at least one of the plurality of auxiliary elements;
if the identification information is included in the table, selecting one of the plurality of auxiliary elements hosting a desired contactless application and sending the selection command to the selected auxiliary element; and
sending other incoming commands following the selection command to the selected auxiliary element until reception of a new selection command.

26. The non-transitory computer-readable medium according to claim 25, wherein the computer executable instructions are for sending all other incoming commands following the selection command to said selected auxiliary element until reception of the new selection command.

27. The non-transitory computer-readable medium according to claim 25, wherein the plurality of auxiliary elements comprises at least one secure element and at least one universal integrated circuit card (UICC); and wherein the computer executable instructions are for, if the identification information is not included in the table, selecting the UICC and sending the selection command to the UICC.

28. The non-transitory computer-readable medium according to claim 27, wherein the computer executable instructions are for, if the desired contactless application is not hosted in the UICC, sending a response including an error message to the contactless element.

29. The non-transitory computer-readable medium according to claim 25, wherein one of the plurality of auxiliary elements includes a default contactless application, and if a first incoming command received by the contactless element is not a selection command, the computer executable instructions also being for selecting one of the plurality of the auxiliary elements hosting the default contactless application and sending all other incoming commands following the first incoming command to the selected auxiliary element until reception of the new selection command.

* * * * *